Sept. 30, 1924.
J. PELYP
FLYTRAP
Filed Feb. 7, 1924
1,509,874
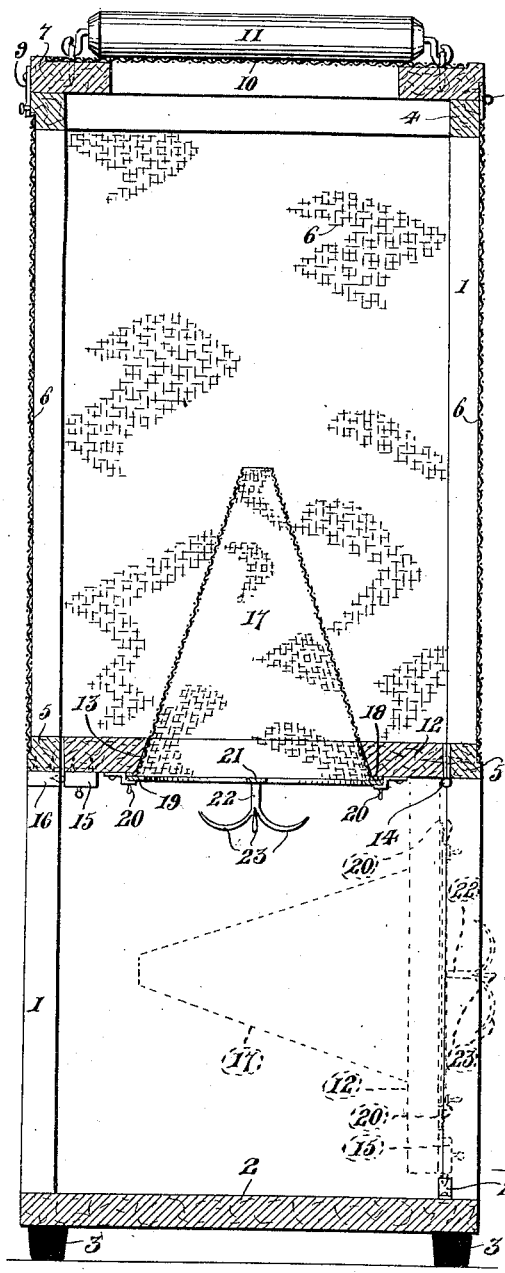
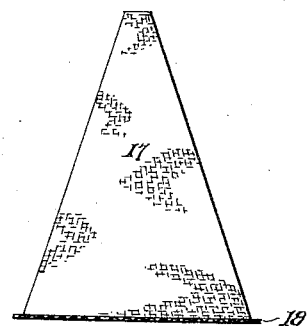
FIG. 3.
FIG. 4.
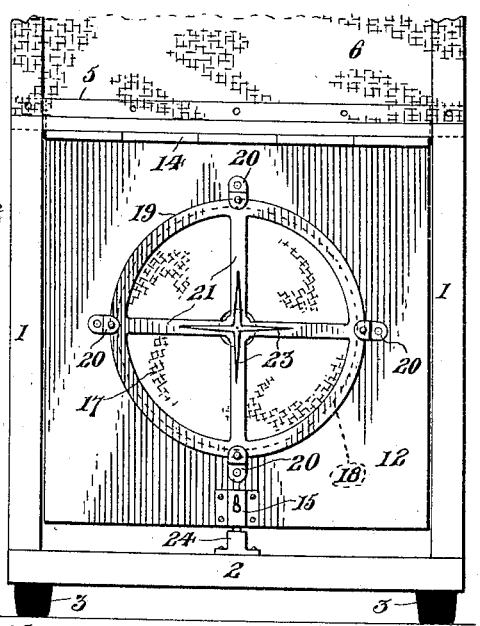
Inventor
J. Pelyp
By F. K. Bryant
Attorney Patented Sept. 30, 1924.

1,509,874

UNITED STATES PATENT OFFICE.

JOHN PELYP, OF CHICAGO, ILLINOIS.

FLYTRAP.

Application filed February 7, 1924. Serial No. 691,208.

*To all whom it may concern:*

Be it known that I, JOHN PELYP, a citizen of the Dominion of Canada, residing at Chicago, in the county of Cook and State of Illinois, have invented certain new and useful Improvements in Flytraps, of which the following is a specification.

This invention relates to certain new and useful improvements in fly traps of the screen type wherein a cage is provided with a conical entrance adjacent the lower end thereof carried by a hinged frame adapted to be moved to a position to facilitate the positioning of bait in proximity to the cone-shaped entrance and also for purposes of cleaning the trap.

With the above and other objects in view that will appear as the nature of the invention is better understood, the same consists of the novel form, combination and arrangement of parts hereinafter more fully described, shown in the accompanying drawing and claimed.

In the accompanying drawing, wherein like reference characters designate corresponding parts throughout the several views, Figure 1 is a vertical sectional view of a fly trap constructed in accordance with the present invention, the frame supporting the cone-shaped entrance and bait device being lowered, as illustrated by dotted lines to facilitate the placing of bait.

Figure 2 is a fragmentary side elevational view showing the frame supporting the cone-shaped entrance and base support in a lowered position, Figure 3 is a side elevational view of the cone-shaped entrance removed from the trap, and Figure 4 is a side elevational view of the bait device.

Referring more in detail to the accompanying drawing, there is illustrated a fly trap embodying a frame structure having vertical corner posts 1 supported at their lower ends by the corners of a platform 2 that is mounted upon cushioned feet 3, the corner posts 1 being braced at their upper ends by rectangular frame bars 4 while similar frame bars 5 connect the corner posts 1 at a point spaced upwardly from the platform 2.

The frame structure between the bars 4 and 5 is covered by a screen 6 while the lower end thereof between the frame bars 5 and platform 2 is open as illustrated in Figs. 1 and 2. A cover frame 7 is hinged as at 8 to the upper frame bars 4 and has a catch 9 engaging the frame bars 4 for holding the cover in a closed position, a screen 10 extending over the central opening in the cover 7 while a handle 11 carried by said cover facilitates handling of the trap.

A rectangular frame 12 having a central circular opening 13 therein is hinged as at 14 within the frame bars 5 and carries a latch 15 at the side thereof opposite the hinge 14 for engagement with the keeper 16 carried by the adjacent frame bar 5.

A screen cone-shaped entrance 17 is positioned in the opening 13 in the frame 12 and has an outwardly directed annular extension 18 at its larger end that contacts the bottom face of the frame. A bait holder in the form of a ring 19 is positioned against the extension 18 and is so retained by the latching clips 20 carried by the lower side of the frame 12. Spider arms 21 are carried by the ring 19 and centrally support a depending pin 22 having a plurality of hooks 23 at its lower end upon which suitable bait is mounted.

In placing bait upon the hooks 23, the latch 15 is released from the keeper 16 and the frame 12 is permitted to swing downwardly upon its hinged mounting 14 to the dotted line position shown in Fig. 1 and the full line position shown in Fig. 2, the frame 12 being rigidly supported when in its lowered position by the latch 15 engaging the keeper 24 carried by the lower platform 2. With the frame 12 positioned as shown in Fig. 2, bait may be conveniently placed upon the hooks 23 and the ring 19 supporting the bait hooks and the cone-shaped entrance 17 are readily removable for purposes of cleaning and the like.

While there is herein shown and described the preferred embodiment of the present invention, it is nevertheless to be understood that minor changes may be made therein without departing from the spirit and scope of the invention as claimed.

What is claimed as new is:—

1. In a fly trap, a frame structure, a screened casing carried by the structure, a hinged cover for the casing, a platform at the lower end of the structure, a hinged bottom for the casing spaced upwardly from the platform, and a cone-shaped entrance and bait support detachably connected to the bottom, said bait support including a ring, spider arms carried by the ring and bait hooks depending from the center of the spider arms.

2. In a fly trap, a frame structure, a screened casing carried by the structure, a hinged cover for the casing, a platform at the lower end of the structure, a hinged bottom for the casing spaced upwardly from the platform, and a cone-shaped entrance and bait support detachably connected to the bottom, said connection including latching clips carried by the bottom and engaging the larger end of the cone-shaped entrance and the bait support, said bait support including a ring, spider arms carried by the ring and bait hooks depending from the center of the spider arms.

3. In a fly trap, a frame structure, a screened casing carried by the structure, a hinged cover for the casing, a platform at the lower end of the structure, a hinged bottom for the casing spaced upwardly from the platform, a cone-shaped entrance and bait support detachably connected to the bottom, said bait support including a ring, spider arms carried by the ring and bait hooks depending from the center of the spider arms, a latch carried by the bottom and a keeper carried by the frame and platform for holding the bottom in an elevated operative position or lowered for baiting.

4. In a fly trap, a frame structure, a screened casing carried by the structure, a hinged cover for the casing, a platform at the lower end of the structure, a hinged bottom for the casing spaced upwardly from the platform, a cone-shaped entrance and bait support detachably connected to the bottom, said connection including hinged clips carried by the bottom and engaging the larger end of the cone-shaped entrance and the bait support, said bait support including a ring, spider arms carried by the ring and bait hooks depending from the center of the spider arms, a latch carried by the bottom and a keeper carried by the frame and platform for holding the bottom in an elevated operative position or lowered for baiting.

In testimony whereof I affix my signature.

JOHN PELYP.